Patented Mar. 22, 1949

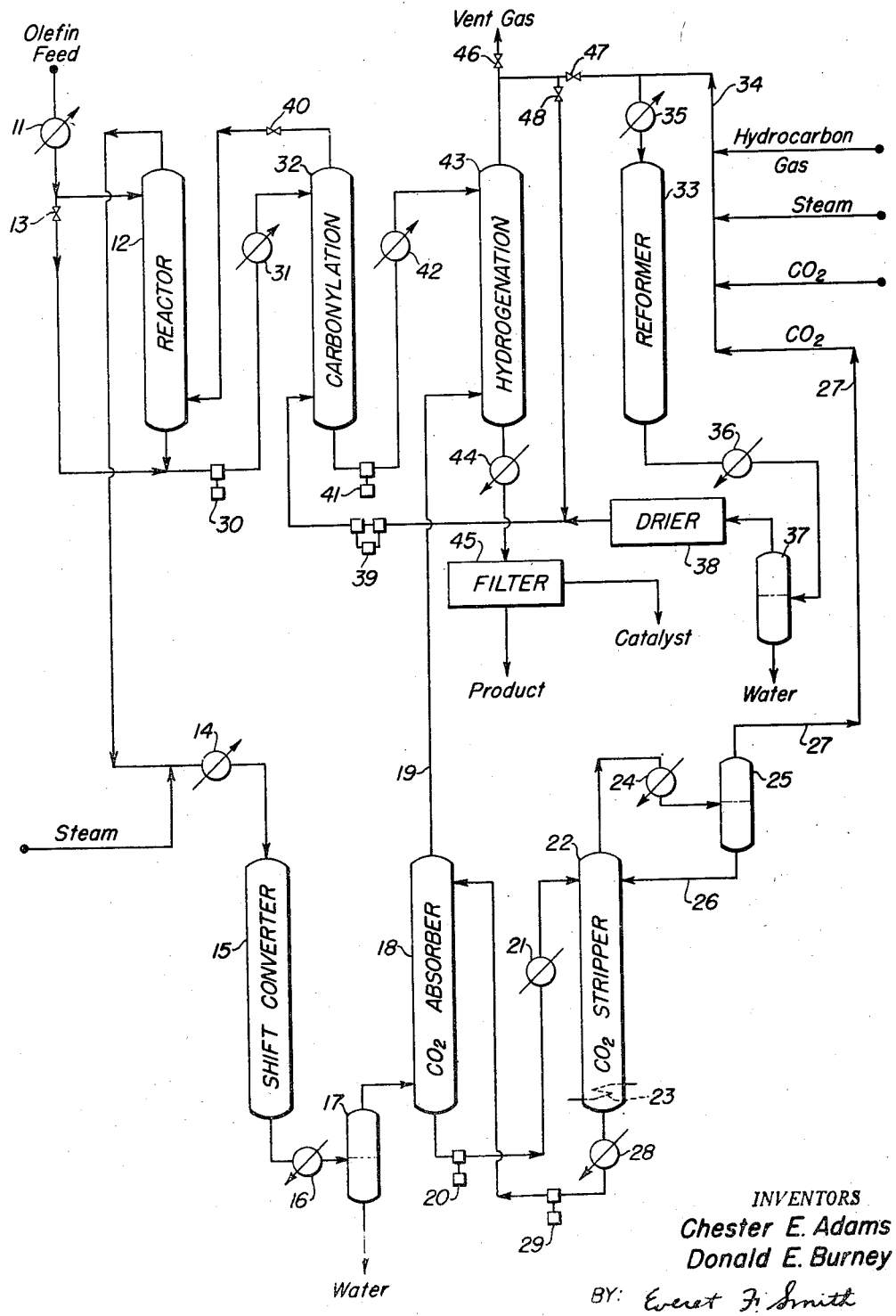

2,464,916

UNITED STATES PATENT OFFICE 2,464,916

OXO PROCESS

Chester E. Adams, Highland, and Donald E. Burney, Griffith, Ind., assignors to Standard Oil Company, Chicago, Ill., a corporation of Indiana Application November 29, 1947, Serial No. 788,846

10 Claims. (Cl. 260—638)

Our invention relates to the so-called "Oxo" process, wherein an olefin is reacted with a mixture of hydrogen and carbon monoxide in the presence of cobalt or iron, and the resulting aldedyde is subsequently hydrogenated to the corresponding alcohol. More particularly, our invention relates to a novel combination of process steps whereby the optimum utilization of process gases is effected, and the problems arising from catalyst migration are minimized.

The Oxo process as ordinarily carried out comprises two basic steps: first, a "carbonylation" step, in which an olefin is reacted with a mixture of hydrogen and carbon monoxide to produce an aldehyde:

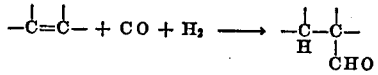

and second, a hydrogenation step, in which the carbonylation product is converted into the corresponding alcohol:

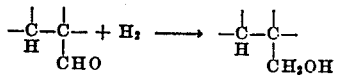

This two-step process has been operated in various ways in the past, but until now all of them have presented troublesome operating problems and serious economic difficulties. The major operating problem arises from the fact that in the carbonylation step, the catalyst tends to be converted into the metal carbonyl, which dissolves in the reaction product and is carried out of the reaction zone. A serious economic objection to the process as heretofore practiced arises from the fact that two different gas streams must be provided: a mixture of hydrogen and carbon monoxide for the first step, and a stream of substantially pure hydrogen for the second step. We have now devised a novel process wherein a single gas stream, comprising carbon monoxide and an excess of hydrogen, is supplied to the carbonylation reaction zone; and the effluent gases therefrom, containing the unreacted hydrogen, are subsequently contacted with fresh olefin feed and metallic catalyst. Thereby, a sufficient quantity of catalyst, in the form of the metal carbonyl, may be added to the olefin feed to make up for the quantity of catalyst normally lost from the carbonylation zone; and simultaneously virtually all metal carbonyls and at least part of the carbon monoxide in the hydrogen stream are removed. The hydrogen stream may thereafter be used for the hydrogenation step, optionally after an additional purification step, as will be described more fully below.

In addition, our process may include other features, such as the use of high temperatures in the carbonylation zone to minimize catalyst migration, the interchange of reactors at intervals according to the extent of catalyst depletion and build-up in the various reaction zones, and the recycle of the effluent hydrogen stream from the hydrogenation reactor.

One object of our invention is to provide a means for stabilizing the catalyst content of the carbonylation reactor in the Oxo process. Another object of our invention is to provide an improved method for supplying a purified hydrogen stream to the hydrogenation reactor in the Oxo process. A further object of our invention is to recover unused carbon monoxide from the carbonylation-step effluent gases and liquid product. Other objects of our invention, and its advantages over the prior art will be apparent from the specification and claims.

The attached flowsheet illustrates an especially advantageous embodiment of our invention. In conjunction with the description thereof, we have defined the broad and preferred ranges of operating conditions under which a process based on our invention may be carried out.

An olefin feed stream is supplied through heater 11 into the top of gas-purification and catalyst-makeup reactor 12. The olefin stream may contain any of the group of olefinic compounds suitable for reaction with carbon monoxide and hydrogen in the Oxo process. For example, we may use alkenes, such as ethylene, propylene, 1-butene, 2-butene, isobutylene, hexenes, octenes, cetenes, and the like; hydrocarbon-substituted alkenes, such as styrene and the like; cycloalkenes, such as cyclopentene, cyclohexene, methylcyclohexenes, and the like; olefin polymers, such as diisobutylene, n-butylene-isobutylene codimer, and the like; and polyolefins, such as butadiene, isoprene, and the like. The olefin stream flows downward through reactor 12 and is contacted countercurrently therein with effluent gases from the carbonylation reactor (described below) in the presence of a fixed catalyst bed containing catalytically active metallic cobalt and/or iron. The gas stream entering reactor 12 ordinarily contains a minor proportion of metal carbonyls carried over from the carbonylation reactor, plus a substantial proportion of carbon monoxide, for example, from 20 to 40 percent, which is left in the gas stream after the carbonylation reaction, owing to the equilibria involved under the optimum reaction conditions in the carbonylation zone. This gas is undesirable for use in the subsequent hydrogenation of the liquid carbonylation product, owing to the serious retarding influence of the carbon monoxide on the hydrogenation. An at least partial purification of the gas stream is effected in reactor 12, where the metal carbonyls are scrubbed out of the gas stream by the olefin charging stock, and where the temperature and pressure in the reactor are adjusted to suitable levels at which the formation of cobalt or iron carbonyl is favored. The temperature within reactor 12 should preferably be kept between about 125 and 200° F. to effect a rapid reaction between the carbon monoxide and the catalyst metal, and the pressure within reactor 12 is preferably kept at or slightly above the pressure within the hydrogenation reactor, described below. In operating our process we prefer to adjust the conditions within reactor 12 so that the concentration of dissolved cobalt leaving the reactor is approximately equal to the concentration of dissolved cobalt leaving the carbonylation reactor. This is most conveniently effected by adjustment of the liquid space velocity within the reactor, suitably through by-passing a portion of the olefin charging stock by way of valve 13 around the reactor.

If desired, a solvent may be added to the olefin stream entering reactor 12. For example, a solvent may be added to help in dissolving and removing the metal carbonyl that is formed therein, preferably a portion of the alcohols ultimately produced in the process, or a fraction thereof. Alternatively, various other inert solvents may be added; for example, a saturated aliphatic hydrocarbon, an aromatic hydrocarbon, a naphthenic hydrocarbon, or an ether.

The hydrogen stream emerging from reactor 12 may be used directly for the hydrogenation step of our process (described below); but when it contains in excess of around 2% of carbon monoxide, it should preferably be subjected to an additional purification step to reduce the carbon monoxide concentration below around 2%, suitably by methanation over a nickel catalyst at a temperature above about 400° F., or by scrubbing at elevated pressure with a copper solution, such as cuprous ammonium formate, or by subjecting the gas stream to the so-called water-gas shift reaction and subsequently scrubbing out the resulting carbon dioxide. The flow-sheet illustrates the last alternative. The effluent gas stream from reactor 12 is combined with steam and passed through heater 14 into shift converter 15, where the mixture is contacted with a suitable catalyst, such as iron, at a temperature around 500 to 1000° F. Substantially all of the carbon monoxide is converted thereby into carbon dioxide. The gas stream emerging from converter 15 flows through cooler 16 into separator 17, from which condensed water is withdrawn, and the gas stream is separated and led into the lower portion of absorber 18. Therein, the gas stream flows upward in countercurrent contact with an aqueous monoethanolamine solution, which scrubs out substantially all of the carbon dioxide. A purified hydrogen stream emerges overhead through line 19. A monoethanolamine solution of carbon dioxide is withdrawn from the bottom of absorber 18 and transferred by pump 20 through heater 21 into the upper portion of stripper 22, equipped with reboiler 23. The carbon dioxide is stripped out at elevated temperature, and flows from the top of the stripper through cooler 24 into separator 25. Condensed liquids are refluxed to the stripper through line 26, and the carbon dioxide is taken off through line 27. The carbon dioxide is preferably recycled to the gas-preparation step, as shown in the flow-sheet and described below, but may be purged if desired, or withdrawn and used for other purposes. Regenerated aqueous monoethanolamine solution flows from the bottom of striper 22 through cooler 28, and is recycled by pump 29 to the top of absorber 18.

The liquid stream emerging from the bottom of reactor 12 contains a quantity of metal carbonyl. This stream is transferred continuously by pump 30 through heater 31 into the top of carbonylation reactor 32, where it flows downward in contact with an active, fixed-bed catalyst, suitably similar to the catalyst in reactor 12, and reacts with a countercurrent stream of carbon monoxide and hydrogen containing in excess of the quantity of hydrogen actually required in reactor 32. The ratio of hydrogen to carbon monoxide in the gas stream entering reactor 32 may be up to around 5:1 or higher, the reaction temperature may be between around 200 and 500° F., the pressure may be between about 50 and 300 atmospheres or higher, and the liquid space velocity may be between about 0.05 and 10 per hour; preferably, however, we choose to operate at a hydrogen-to-carbon monoxide ratio between about 2:1 and 3:1, a temperature between about 300 and 450° F., a pressure around 200 atmospheres, and a space velocity between about 0.5 and 1 per hour. The optimum temperature range lies between about 375 and 425° F., since within this range the formation of metal carbonyls is greatly repressed without substantial reduction in the overall yield of carbonylation product, and the loss of catalyst from the carbonylation zone is thereby materially reduced.

Alternatively, the carbonylation reaction may be effected in a series of zones (not shown) at progressively higher temperatures. Two zones may advantageously be employed, the first zone being maintained around 275 to 375° F., and the second zone between about 375 and 425° F. The temperature within the first zone favors a maximum conversion of olefins to aldehydes per pass; and the temperature within the second zone minimizes the loss of catalyst metal therefrom. The catalyst metal tends to build up in the high-temperature zones; manifolding means should therefore be provided for interchanging the zones from time to time to prevent such an accumulation of solids as would interfere with the flow of reactants. The carbonylation reaction zones may be separate reaction vessels or separate portions of a single vessel.

Catalysts comprising cobalt and/or iron are suitable for the carobonylation reaction. The catalytic metal is preferably supported on a pelleted or granular inert carrier, such as silica, pumice, kieselguhr, or the like. Various promoters such as thoria, magnesia, and the like, may be combined with the catalyst.

Hydrogen and carbon monoxide are supplied to reactor 32 by reformer 33. A gasiform charging stock comprising steam and a hydrocarbon, such as natural gas, together with a quantity of carbon dioxide if a lower hydrogen-to-carbon monoxide ratio is desired, is supplied through line 34 and heater 35 to reformer 33. The carbon dioxide may be obtained wholly or in part from stripper 22 through line 27. Within reformer 33 the gasiform charging stock is reacted at a temperature around 1800° F. over a nickel catalyst promoted with cerium, and is converted thereby into a mixture comprising hydrogen, carbon monoxide, and steam. This mixture flows through cooler 36 into separator 37, from which condensed water is withdrawn. The gas stream from separator 37 passes through drier 38, suitably a glycol scrubber or a contacting zone containing silica gel or activated alumina, and the dry gas flows into compressor 39, from which it is supplied to the bottom of reactor 32.

The gas stream emerging from the top of reactor 32 flows through valve 40, at which the pressure is reduced if desired, into the bottom of reactor 12.

The carbonylation product from reactor 32, containing a quantity of dissolved metal carbonyl, is transferred by pump 41 through heat-exchanger 42 into the top of hydrogenation reactor 43, where it flows downward over a catalyst, suitably similar to the catalyst in reactor 32, countercurrent to a stream of purified hydrogen from absorber 18 through line 19, as shown, or from reactor 12. Therein, the aldehydes are hydrogenated to the corresponding alcohols at temperatures suitably between about 100 and 700° F. and at elevated pressure. Preferably, the hydrogenation is effected over a cobalt catalyst at a temperature between about 350 and 600° F., a pressure between about 500 and 1500 pounds per square inch, and a space velocity between about 0.2 and 2.0 volumes of liquid per volume of reaction zone per hour, as disclosed in the copending application of Donald E. Burney and William J. Cerveny, Serial No. 788,847, filed November 29, 1947.

Simultaneously, the dissolved metal carbonyl is decomposed, the liberated metal is deposited on the catalyst pellets and on the reactor walls, and the liberated carbon monoxide is stripped out by the stream of hydrogen. The hydrogenated liquid emerges from the bottom of reactor 43 through cooler 44 and filter 45, where any entrained catalyst is separated, and the filtered liquid product is withdrawn to storage or further processing.

The hydrogen stream emerging from the top of reactor 43 contains a minor proportion of carbon monoxide, together with accumulated inert materials, such as nitrogen. A suitable proportion of this gas stream is purged through valve 46 to prevent the build-up of inerts. Another proportion is recycled to reformer 33 through valve 47 in order to utilize the hydrocarbons and to prevent them from building up in the system. The remainder of the hydrogen stream is recycled through valve 48 and compressor 39 to reactor 32.

It will be apparent from the foregoing description that the metal catalyst content of reactor 12 gradually decreases, the metal which it loses being caught predominantly in reactor 43. When the depletion of catalyst in reactor 12 has reached a point where the clean-up of hydrogen therein becomes unsatisfactory, or when the catalyst build-up in reactor 43 tends to become obstructive, the flows are changed by appropriate valves and manifolding lines (not shown) so that the apparatus used for reactors 12 and 43 are interchanged.

The quantity of catalyst in reactor 32 may be either augmented or diminished by the carbonylation reaction, depending on the reaction conditions therein and the concentration of metal carbonyl in the olefin feed stream. Reactor 32 may therefore be manifolded with reactors 12 and 43 and interchanged therewith as indicated by their relative catalyst contents. Ordinarily, however, we prefer to operate our process under such conditions that the quantity of catalyst within the carbonylation reactor remains substantially constant, as illustrated in the following example:

*Example*

A n-butylene-isobutylene codimer is prepared by treating a mixture of n-butylenes and isobutylene at 350–500° F. and 40 atmospheres with a catalyst comprising phosphoric acid adsorbed on clay. The resulting codimer, after passing through a gas-purification and catalyst-makeup zone, described below, is passed into a carbonylation zone containing an 8% cobalt on 10–20 mesh "Filtros" (a bonded silica) and contacted at 330° F., 200 atmospheres, and 0.1 volume of liquid per volume of catalyst zone per hour with a 2:1 mixture of hydrogen and carbon monoxide in the ratio of 5 moles of the gas mixture per mole of codimer. Under these conditions, approximately 38% of the codimer is converted into nonyl aldehydes, and approximately 8% is converted into nonyl alcohols. The resulting liquid product contains approximately 9 pounds of soluble cobalt per thousand gallons, and the effluent gas stream, measuring approximately 4 moles per mole of codimer charging stock, comprises around 30 per cent carbon monoxide, a small proportion of cobalt carbonyl and inert gases, and the remainder hydrogen. This gas, when contacted with cobalt and fresh codimer at around 175° F. and 1000 pounds per square inch forms cobalt carbonyl and adds it to the codimer in a concentration which is regulated to the equivalent of 9 pounds of cobalt per thousand gallons by adjusting the space velocity therein, suitably by by-passing a portion of the codimer around the reaction zone; and simultaneously the carbon monoxide content of the gas stream is reduced an equivalent amount. The effluent gas is then further purified by contacting it with an iron catalyst at 850° F. in admixture with two volumes of steam per volume of gas, and scrubbing out the resulting carbon dioxide with an aqueous monoethanolamine solution. The liquid product stream from the carbonylation zone is subsequently contacted countercurrently with the purified hydrogen stream at 400° F., 800 pounds per square inch, and 0.6 volume of liquid per volume of catalyst zone per hour in the presence of a supported cobalt catalyst. The nonyl aldehydes are hydrogenated thereby to the corresponding nonyl alcohols in an overall conversion of 46%, based on the codimer charged. Simultaneously the dissolved cobalt carbonyl is decomposed, the liberated cobalt is deposited on the catalyst support, and the liberated carbon monoxide is stripped out by excess hydrogen and recycled to the carbonylation zone.

It will be apparent that the advantageous features of our invention may be realized over a wide range of process conditions and with numerous modifications of the process steps described in the foregoing example. As an illustration, we prefer to operate with continuous, countercurrent reactors, as shown in the flow-sheet; however, the use of such reactors is not an essential feature of our process. We may, for example, contact the various liquid and gas streams in concurrent flow, either downward or upward. As a further example, we may introduce the catalytic metal into purification reactor 12 either wholly or partly in the form of oil-soluble salts of the metal, suitably cobalt naphthenate, iron stearate, and the like. As a still further example, we may add nickel to our catalyst as an aid to the removal of carbon monoxide from the hydrogen gas stream in purification reactor 12, and as an effective catalyst for the saturation of olefins in the hydrogenation zone. The specific conditions, steps, and apparatus set forth above are not to be construed as limiting our invention thereto, and it is to be understood that any modifications or equivalents that would ordinarily occur to those skilled in the art are to be considered as lying within the scope of our invention.

In the foregoing description, the expression "purified hydrogen" is to be understood as referring to a gasiform hydrogen-containing stream containing a diminished concentration of carbon monoxide, metal carbonyls, and/or other constituents which tend to retard the hydrogenation of aldehydes derived from the carbonylation step of the Oxo process.

In accordance with the foregoing specification, we claim as our invention:

1. In a process for converting on olefin into an alcohol by carbonylating said olefin with carbon monoxide and hydrogen at elevated temperature and pressure in the presence of a catalyst containing a metal selected from the group consisting of cobalt and iron, and subsequently hydrogenating the resulting aldehyde, the steps which comprise effecting said carbonylation in a first zone with a mixture of hydrogen and carbon monoxide containing an excess of hydrogen; withdrawing from said first zone a liquid carbonylation product and a gasiform stream containing said excess hydrogen and unreacted carbon monoxide; contacting said gasiform stream in a second zone with an additional quantity of said catalyst and a charging stock containing said olefin under conditions of temperature and pressure at which a carbonyl derivative of said catalyst is formed; withdrawing a mixture of said charging stock and said carbonyl derivative from said second zone and introducing said mixture into said first zone as liquid feed stream thereto; and withdrawing a purified hydrogen stream from said second zone and effecting the hydrogenation of said carbonylation product therewith.

2. The process of claim 1 wherein said carbonylation is effected at a temperature between about 200 and 500° F., a pressure between about 50 and 300 atmospheres, and a liquid space velocity between about 0.05 and 10 per hour.

3. The process of claim 1 wherein said second zone is maintained at a temperature between about 125 and 200° F.

4. The process of claim 1 wherein the conditions within said second zone are adjusted to add to the charging stock a quantity of the carbonyl derivative of said catalyst equivalent in metal content to the quantity of catalyst metal carried out of said first zone by the carbonylation product.

5. The process of claim 1 wherein the purified hydrogen from said second zone is subjected to a supplementary purification step to reduce the carbon monoxide content thereof below about 2% prior to the use of said hyrdogen in said hydrogenation step.

6. The process of claim 1 wherein said second zone and the hydrogenation zone are interchanged at intervals, as required to prevent complete depletion of the catalyst metal from the former and obstructive accumulation of the catalyst metal in the latter.

7. The process of claim 1 wherein the effluent gas stream from the hydrogenation zone, comprising a quantity of carbon monoxide stripped from the carbonylation product, together with unutilized hydrogen, is recycled to said first zone.

8. The process of claim 1 wherein said olefin is carbonylated in the presence of a cobalt catalyst.

9. The process of claim 8 wherein said olefin is carbonylated at a temperature between about 375 and 425° F.

10. A process for preparing nonyl alcohols which comprises contacting a n-butylene-isobutylene codimer with carbon monoxide and an excess of hydrogen in a first zone in the presence of a cobalt catalyst at a temperature between about 200 and 500° F., a pressure between about 50 and 300 atmospheres, and a space velocity between about 0.05 and 10 volumes of liquid per volume of catalyst zone per hour; withdrawing from said first zone a liquid carbonylation product and a gasiform stream containing said excess hydrogen and unreacted carbon monoxide; contacting said gasiform stream in a second zone with said n-butylene-isobutylene codimer and an additional quantity of cobalt at a temperature between about 125 and 200° F. and at a pressure at which cobalt carbonyl is formed; withdrawing a mixture of said n-butylene-isobutylene codimer and cobalt carbonyl from said second zone and introducing said mixture into said first zone as liquid feed stream thereto; withdrawing a purified hydrogen stream from said second zone; further purifying said hydrogen stream to reduce the carbon monoxide content thereof below about 2%; and contacting said carbonylation product with the resulting purified hydrogen stream and a cobalt catalyst in a third zone under hydrogenation conditions, whereby nonyl aldehydes in said carbonylation product are converted into nonyl alcohols.

CHESTER E. ADAMS.
DONALD E. BURNEY.

REFERENCES CITED

The following references are of record in the file of this patent:

UNITED STATES PATENTS

| Number | Name | Date |
|---|---|---|
| 2,250,421 | Riblett | July 22, 1941 |
| 2,276,921 | Brown | Mar. 17, 1942 |
| 2,327,066 | Roelen | Aug. 17, 1943 |
| 2,414,276 | Sensel et al. | Jan. 14, 1947 |
| 2,437,600 | Gresham et al. | Mar. 9, 1948 |

OTHER REFERENCES

"Interrogation of Dr. Otto Roelen," by C. C. Hall et al., published July 18, 1947, by Office of Technical Services, Dept. of Commerce, Washington, D. C. Reprinted by Hobart Publishing Co., Box 4127, Chevy Chase Br., Washington 15, D. C., pages 3, 44, 45, 47, 64.